(No Model.)

J. J. LUDWICK.
OIL CUP HOLDER.

No. 321,618. Patented July 7, 1885.

Witnesses.
John C. Perkins
John H. Chase

Inventor.
Jay J. Ludwick
By Lucius C. West
Attorney

UNITED STATES PATENT OFFICE.

JAY J. LUDWICK, OF CHARLOTTE, MICHIGAN.

OIL-CUP HOLDER.

SPECIFICATION forming part of Letters Patent No. 321,618, dated July 7, 1885.

Application filed November 22, 1884. (No model.)

*To all whom it may concern:*

Be it known that I, JAY J. LUDWICK, a citizen of the United States, residing at Charlotte, county of Eaton, State of Michigan, have invented a new and useful Oil-Cup Holder, of which the following is a specification.

The object of this invention is to construct a simple and easily-operated device for connection with the frame of agricultural implements, or any vehicles bearing machinery, adapted to detachably hold an oil-sup, substantially as hereinafter described and claimed.

Figure 1:
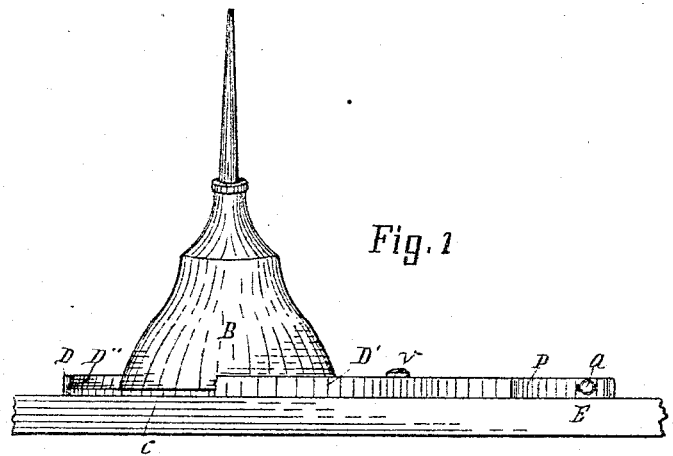
Figure 2:
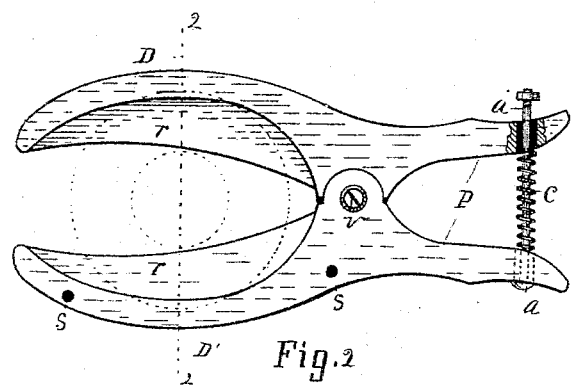
Figure 3:
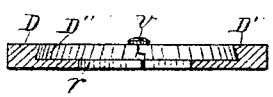

In the drawings forming a part of this specification, Figure 1 is a plan elevation, showing the holder secured to a beam; Fig. 2, The holder consists of a jaw, D', secured on top view with portion broken away, and Fig. 3 a section on line 2 2 in Fig. 2, looking from a point at the left hand.
top of a beam of the implement frame E by bolts or screws at S, and a like jaw, D, pivotally connected with the stationary jaw at $v$. Each jaw has a bottom support or cup-rest, $r$ $r$, above which the inner sides of the jaws are provided with beveled gains D'', adapted to engage the lower sides of the oil-cup B. The jaws D D' have handles or rear extensions, P, beyond the pivot $v$, through the ends of which is loosely inserted a rod, $a$, bearing a spring, $c$.
This spring causes the jaws D D' of the holder to firmly engage the oil-cup, and still admits of opening the jaws, to readily place in or take out the oil cup.

It is designed to locate the holder at a point on the frame the most accessible to the driver or operator.

The holder is so simple that it can be manufactured and furnished ready to secure to the frame of the implement very cheaply, and is easy to attach and to operate.

Deeming no further description of the operation necessary, what I claim and desire to secure by Letters Patent of the United States, is—

1. The oil-cup holder consisting of the jaw adapted for stationary connection with the frame of an implement or machine-vehicle, the movable jaw pivoted thereto, said jaws provided with the bottom rests and the bevel-gains, the ends of the handles of said jaws bearing a loose bolt and tension-spring, all substantially as set forth.

2. The combination of an implement frame or machine vehicle-frame, the oil-cup holder consisting of the stationary jaw and the pivotally-connected spring-actuated jaw, and an oil-cup, said jaws being adapted to engage the bottom and lower side of the cup, substantially as set forth.

In testimony of the foregoing I have hereunto subscribed my name in presence of two witnesses.

JAY J. LUDWICK.

Witnesses:
G. M. ELY,
S. T. GREEN.